United States Patent
Jiang et al.

(10) Patent No.: US 10,440,934 B2
(45) Date of Patent: Oct. 15, 2019

(54) LOW DENSITY COMPOSITIONS WITH SYNERGISTIC ABSORBANCE PROPERTIES

(71) Applicant: EP Minerals, LLC, Reno, NV (US)

(72) Inventors: Chongjun Jiang, Berwyn, PA (US); Pragati Galhotra, Ontario, CA (US); Scott Kevin Palm, Reno, NV (US); Wilson Kamau Wanene, Warner Robins, GA (US); Sean Spencer Crow, Reno, NV (US); Vishal Gupta, Reno, NV (US); Kara Linn Evanoff, Reno, NV (US)

(73) Assignee: EP Minerals, LLC, Reno, NV (US)

( * ) Notice: Subject to any disclaimer, the term of this patent is extended or adjusted under 35 U.S.C. 154(b) by 20 days.

(21) Appl. No.: 15/505,007

(22) PCT Filed: Aug. 19, 2015

(86) PCT No.: PCT/US2015/045891
§ 371 (c)(1),
(2) Date: Feb. 17, 2017

(87) PCT Pub. No.: WO2016/032821
PCT Pub. Date: Mar. 3, 2016

(65) Prior Publication Data
US 2017/0265428 A1    Sep. 21, 2017

Related U.S. Application Data

(60) Provisional application No. 62/041,946, filed on Aug. 26, 2014.

(51) Int. Cl.
| | |
|---|---|
| A01K 1/015 | (2006.01) |
| B01J 20/28 | (2006.01) |
| B01J 20/16 | (2006.01) |
| B01J 20/30 | (2006.01) |
| C09K 3/32 | (2006.01) |
| B01J 20/18 | (2006.01) |
| B01J 20/14 | (2006.01) |
| B01J 20/12 | (2006.01) |
| B01J 20/10 | (2006.01) |

(52) U.S. Cl.
CPC .......... *A01K 1/0154* (2013.01); *A01K 1/0155* (2013.01); *B01J 20/10* (2013.01); *B01J 20/12* (2013.01); *B01J 20/14* (2013.01); *B01J 20/165* (2013.01); *B01J 20/18* (2013.01); *B01J 20/28004* (2013.01); *B01J 20/28011* (2013.01); *B01J 20/30* (2013.01); *C09K 3/32* (2013.01); *B01J 2220/42* (2013.01)

(58) Field of Classification Search
CPC ...... A01K 1/0154; A01K 1/0155; C09K 3/32; B01J 20/28004; B01J 20/28011; B01J 20/30; B01J 20/12; B01J 20/165; B01J 20/18; B01J 20/14; B01J 20/10; B01J 2220/42
See application file for complete search history.

(56) References Cited

U.S. PATENT DOCUMENTS

| | | |
|---|---|---|
| 3,675,625 A | 7/1972 | Miller et al. |
| 3,921,581 A | 11/1975 | Brewer |
| 3,983,842 A | 10/1976 | Marion et al. |
| 4,085,704 A | 4/1978 | Frazier |
| 4,275,684 A | 6/1981 | Kramer et al. |
| 4,407,231 A | 10/1983 | Colborn et al. |
| 4,437,429 A | 3/1984 | Goldstein et al. |
| 4,494,481 A | 1/1985 | Rodriguez et al. |
| 4,570,573 A | 2/1986 | Lohman |
| 4,622,920 A | 11/1986 | Goss |
| 4,657,881 A | 4/1987 | Crampton et al. |
| 4,685,420 A | 8/1987 | Stuart |
| 4,795,482 A | 1/1989 | Gioffre et al. |
| 4,844,010 A | 7/1989 | Ducharme et al. |
| 5,000,115 A | 3/1991 | Hughes |
| 5,097,799 A | 3/1992 | Heitfeld et al. |
| 5,101,771 A | 4/1992 | Goss |
| RE33,983 E | 7/1992 | Hughes |
| 5,129,365 A | 7/1992 | Hughes |
| 5,151,211 A | 9/1992 | Brooke et al. |

(Continued)

FOREIGN PATENT DOCUMENTS

| | | |
|---|---|---|
| CA | 2722011 A1 | 5/2011 |
| CN | 101868142 A | 10/2010 |
| CN | 102939002 A | 2/2013 |
| CN | 103348924 A | 10/2013 |
| CN | 103348925 A | 10/2013 |
| EP | 0165820 A2 | 12/1985 |
| EP | 0407064 A1 | 1/1991 |
| EP | 0683976 A1 | 11/1995 |
| EP | 0717928 A1 | 6/1996 |
| EP | 0823206 A1 | 2/1998 |
| EP | 0885557 A1 | 12/1998 |

(Continued)

OTHER PUBLICATIONS

Supplementary European Search Report related to Application No. EP 15 836676 dated Jan. 5, 2018.

(Continued)

*Primary Examiner* — Peter F Godenschwager
*Assistant Examiner* — Andrew J. Oyer
(74) *Attorney, Agent, or Firm* — Lorenz & Kopf LLP

(57) ABSTRACT

A composition comprising a physical blend of discrete particulates such that the liquid absorbency is greater than the individual components and is greater than the expected absorbency based on the rule of mixtures. A composition comprising diatomaceous earth which may have a clump strength greater than 75% and in which the dry density may be less than 880 kg/m$^3$ (55 lb/ft$^3$). The compositions exhibit synergistic absorbance, light density, high clump strength, low dustiness, and are suitable for industrial and household absorption and solidification, animal litter, and soil amendment.

10 Claims, No Drawings

(56) References Cited

U.S. PATENT DOCUMENTS

| | | |
|---|---|---|
| 5,152,250 A | 10/1992 | Loeb |
| 5,176,107 A | 1/1993 | Buschur |
| 5,176,879 A | 1/1993 | White et al. |
| 5,183,010 A | 2/1993 | Raymond et al. |
| 5,188,064 A | 2/1993 | House |
| 5,279,259 A | 1/1994 | Rice et al. |
| 5,317,990 A | 6/1994 | Hughes |
| 5,329,880 A | 7/1994 | Pattengill et al. |
| 5,339,769 A | 8/1994 | Toth et al. |
| 5,359,961 A | 11/1994 | Goss et al. |
| 5,386,803 A | 2/1995 | Hughes |
| 5,421,291 A | 6/1995 | Lawson et al. |
| 5,450,817 A | 9/1995 | Hahn et al. |
| 5,542,374 A | 8/1996 | Palmer, Jr. |
| 5,577,463 A | 11/1996 | Elazier-Davis et al. |
| 5,634,431 A | 6/1997 | Reddy et al. |
| 5,641,847 A | 6/1997 | Hozumi et al. |
| 5,648,306 A | 7/1997 | Hahn et al. |
| 5,662,067 A | 9/1997 | Stubbs et al. |
| 5,775,259 A | 7/1998 | Tucker |
| 5,836,263 A | 11/1998 | Goss et al. |
| 5,901,661 A | 5/1999 | Pattengill et al. |
| 5,975,019 A | 11/1999 | Goss et al. |
| 5,992,351 A | 11/1999 | Jenkins |
| 6,019,063 A | 2/2000 | Haubensak et al. |
| 6,039,004 A | 3/2000 | Goss et al. |
| 6,098,569 A | 8/2000 | Kent et al. |
| 6,253,710 B1 | 7/2001 | Ward et al. |
| 6,363,888 B1 | 4/2002 | Sourek, Jr. |
| 6,376,034 B1 | 4/2002 | Brander |
| 6,578,521 B2 | 6/2003 | Raymond et al. |
| 6,824,606 B1 | 11/2004 | Alvarez Berenguer et al. |
| 6,854,421 B2 | 2/2005 | Opfel |
| 6,895,896 B1 | 5/2005 | Bloomer |
| 6,962,129 B1 | 11/2005 | Lawson |
| 7,124,710 B2 | 10/2006 | Weaver |
| 7,343,874 B2 | 3/2008 | DeLeeuw et al. |
| 7,384,892 B2 | 6/2008 | Melbouci et al. |
| 7,387,085 B2 | 6/2008 | Ikegami et al. |
| 7,429,421 B2 | 9/2008 | Greene et al. |
| 7,549,396 B2 | 6/2009 | Hurwitz et al. |
| 7,603,964 B2 | 10/2009 | Jenkins et al. |
| 7,665,418 B2 | 2/2010 | Bracilovic |
| 7,670,277 B2 | 3/2010 | Ross et al. |
| 7,757,638 B2 | 7/2010 | Wang et al. |
| 8,074,605 B2 | 12/2011 | Hurwitz et al. |
| 8,156,896 B2 | 4/2012 | Wadams et al. |
| 8,268,018 B2 | 9/2012 | Privitera et al. |
| 8,273,676 B2 | 9/2012 | Falcone et al. |
| 8,356,578 B2 | 1/2013 | Jenkins et al. |
| 8,607,895 B2 | 12/2013 | Hoskins |
| 8,720,375 B2 | 5/2014 | Miller et al. |
| 8,722,031 B2 | 5/2014 | Lawson et al. |
| 8,739,735 B2 | 6/2014 | Zhang |
| 8,904,963 B2 | 12/2014 | Dixon et al. |
| 9,010,273 B2 | 4/2015 | Adamy et al. |
| 9,010,274 B2 | 4/2015 | Drief et al. |
| 2003/0209203 A1 | 11/2003 | Opfel |
| 2005/0005870 A1 | 1/2005 | Fritter et al. |
| 2005/0175577 A1 | 8/2005 | Jenkins et al. |
| 2006/0042553 A1 | 3/2006 | Venezio |
| 2007/0017453 A1 | 1/2007 | Fritter et al. |
| 2007/0175403 A1 | 8/2007 | Wang et al. |
| 2007/0289543 A1 | 12/2007 | Petska et al. |
| 2008/0132632 A1 | 6/2008 | Schiraldi et al. |
| 2008/0223302 A1 | 9/2008 | Wang et al. |
| 2009/0308323 A1 | 12/2009 | Van Nieuwenhuijzen-Van Rooijen et al. |
| 2011/0017143 A1 | 1/2011 | Matsuo et al. |
| 2011/0123474 A1 | 5/2011 | Jenkins et al. |
| 2011/0174228 A1 | 7/2011 | Liu |
| 2011/0185977 A1 | 8/2011 | Dixon et al. |
| 2012/0280420 A1 | 11/2012 | Boxley et al. |
| 2012/0318205 A1* | 12/2012 | Kuras .................. A01K 1/0155 119/173 |
| 2013/0199456 A1 | 8/2013 | Bracilovic et al. |
| 2014/0069345 A1 | 3/2014 | Lipscomb et al. |
| 2014/0165921 A1 | 6/2014 | Raymond et al. |
| 2014/0171305 A1* | 6/2014 | Nannini .............. B01J 20/3078 502/411 |

FOREIGN PATENT DOCUMENTS

| | | |
|---|---|---|
| EP | 0985341 A2 | 3/2000 |
| EP | 1855520 A2 | 11/2007 |
| EP | 2489269 A1 | 8/2012 |
| WO | 1996002129 A1 | 2/1996 |
| WO | 1999026885 A1 | 6/1999 |
| WO | 1999046979 A1 | 9/1999 |
| WO | 2001060148 A1 | 8/2001 |
| WO | 2006086410 A2 | 8/2006 |
| WO | 2006096874 A2 | 9/2006 |
| WO | 2009133212 A1 | 11/2009 |
| WO | 2011091262 A2 | 7/2011 |
| WO | 2013134861 A1 | 9/2013 |
| WO | 2014066823 A1 | 5/2014 |
| WO | 2015031998 A1 | 3/2015 |
| WO | 2015065351 A1 | 5/2015 |

OTHER PUBLICATIONS

International Search Report Application No. PCT/US2015/045891 reported on Nov. 12, 2015.

* cited by examiner

LOW DENSITY COMPOSITIONS WITH SYNERGISTIC ABSORBANCE PROPERTIES

CROSS REFERENCE TO RELATED PATENT APPLICATION

This patent application is a 35 USC § 371 U.S. national stage filing of International Application No. PCT/US2015/045891 filed on Aug. 19, 2015, and claims the benefit of U.S. Provisional Patent Application No. 62/041,946, filed. Aug. 26, 2014.

TECHNICAL FIELD

The present disclosure generally relates to compositions for absorbing liquids and, more particularly, to compositions for absorbing and solidifying industrial liquids, household liquids, animal waste and for soil amendment.

BACKGROUND

Liquid spills are common and may be small or large in scale. Small spills, such as those involving personal activities such as cooking or attending to the maintenance of a motor vehicle may be cleaned up with cloth or paper. Sawdust, animal litter, or another absorbent material may be used to solidify small spills prior to removal. Larger spills resulting from accidents involving the transport of bulk quantities of liquids, discharge of operating fluids from large machines, or spent drilling fluids may require special vacuum equipment, treatment with an absorbent material, or another means for solidifying the liquid before it can be removed and lawfully disposed.

To clean up a spilled liquid, an absorbent solid material is placed on the liquid and the material absorbs the liquid. An absorbent solid material may also be placed in anticipation of liquid contact. Solids employed in this capacity have typically included cloth, paper, sawdust, and certain minerals in granular or powdered form. Organic materials such as corn, wheat, and walnut shells have also been utilized for liquid absorption, particularly for animal litter. Naturally-occurring substances such as sand, pulverized ceramics, clay, expanded perlite, and diatomaceous earth (DE) may be employed, especially for large scale spills. The absorbent solid material is gathered and disposed after it has absorbed a satisfactory amount of the liquid.

The effectiveness of an absorbent material is measured by its capacity to absorb liquid, known as its absorbent capacity or absorbency. As used herein, the term "absorbency" describes the amount of liquid absorbed by unit mass of absorbent. A higher absorbency may result in better efficacy and lower aggregate cost in terms of transport and disposal. Low density absorbents are desirable because they may be, in some cases, easier and cheaper per unit volume to transport, to handle for use, and to dispose following use. Another desirable attribute of absorbent materials is the ability to self-solidify or agglomerate to form clumps after being wetted. Agglomeration of the material forms an integral mass that holds the absorbed liquid and has enough strength to be removed from the spill site or separated from the unsoiled absorbent. For example, some animal litters agglomerate or self-clump after absorbing urine. The resultant clumps may then be easily removed from the litter box, thus leaving the unsoiled animal litter behind. The integrity of the clump can be quantified as the clump strength. As used herein, the term "clump strength" is the percent value of the clump's initial mass that is retained after the clump is mechanically disturbed, moved, or agitated.

As previously described, an ideal absorbent material would possess high absorbency, low density, and good agglomeration to form a strong clump. While low density is desirable in most applications, too low of a density can be problematic. For example, a very low density absorbent, such as expanded perlite, can be very dusty and can be dispersed easily by a light breeze or air flow. Low density absorbents, such as perlite or compositions comprising perlite, can also be undesirable for use as animal litters, as the animal may inadvertently disperse or kick the litter out of a litter box during use. Further animal litters that are dusty are undesirable because animals and their owners may inhale airborne animal litter particles when either using or maintaining the litter box, respectively. Particle inhalation is undesirable. Crystalline silica (e.g, quartz, cristobalite, tridymite) is an example of a material that is undesirable to inhale. Minimizing exposure to crystalline silica is preferred. Compositions containing high levels of arsenic (As) are also undesirable in case a person or animal were to ingest or solubilize (e.g. via wetting such as licking) the absorbent.

Slacking or mudding is a well-known problem for low quality absorbents. Slacking refers to the tendency of an absorbent to disintegrate after contact with water thereby decreasing absorbent effectiveness. Another problem associated with currently available absorbents is density. Sodium bentonite is an effective absorbent due to its high absorbency and ability to absorb water, but it is less than ideal due to its high density. Sodium bentonite is primarily comprised of sodium montmorillonite, a type of smectite clay. Diatomaceous earth, also known as diatomite and kieseighur, is of low density but has a lower absorbency than sodium bentonite.

Accordingly, there is a need for a composition with superior absorbency, low density, low dustiness, and improved stability in terms of high clump strength and resistance to slacking.

Commonly used absorbents are clay-based materials, including both clumping and non-clumping clays such as sodium bentonite (for example, Wyo-Ben™ Big Horn® clay) and calcium bentonite (for example, EP Minerals® ("EPM") Blue Ribbon clay), respectively. Hectorite is another clumping clay. Clumping materials, such as sodium bentonite and hectorite, swell or change in particle volume as a function of the amount of liquid, such as water, absorbed, a phenomenon related to the crystal structure, composition, and surface properties of the material. Sodium bentonite has a much higher absorbency by unit mass than calcium bentonite (3~5 x). Sodium bentonite is used for its high absorption and good agglomeration despite its high density. While calcium bentonites generally do not swell sufficiently to be effective as clumping agents in, for example, animal litter or the like they can be modified to behave like sodium bentonites through an ion-exchange process. These sodium-beneficiated calcium bentonites are also sometimes called sodium-activated bentonites. For the purposes of this invention, sodium bentonite is defined to include both conventional sodium bentonites and sodium-beneficiated calcium bentonites. Other currently available absorbents do not have high absorbencies and some become slacked after being wetted. Examples of non-clay materials include DE and zeolites. Diatomaceous earth is a siliceous rock comprised of skeletal remains of diatoms. Zeolites are naturally occurring or synthetic porous aluminosilicate materials. Non-clumping materials do not naturally form clumps with high clump strength. As used herein, "clumping" will refer to materials that, when wetted, form a clump that demonstrates high clump strength or integrity. Similarly, "non-clumping" will refer to materials that do not self-clump or materials that self-clump but demonstrate poor clump strength. Poor clump strength is defined as below about 75%.

Desirable animal litter characteristics include high absorbency, an ability to clump, low density, low dustiness, low tracking, low slacking, and odor control. Some animal litters include fragrances, deodorants, clumping agents, and foaming agents.

SUMMARY OF THE DISCLOSURE

In accordance with one aspect of the disclosure, a composition is disclosed that may comprise a fine sorbent particulate and a coarse particulate. The composition may have a multimodal particle size distribution (PSD). The composition may have an absorbency per unit weight greater than a weighted average of the fine sorbent particulate and the coarse particulate by more than 10%. In a refinement, the absorbency per unit weight of the composition may exceed the weighted average absorbency of the fine sorbent particulate and the coarse particulate by more than 100%. In one embodiment, the absorbency per unit weight of the composition may exceed the weighted average absorbency of the fine sorbent particulate and the coarse particulate by about 10% to about 400%. In another embodiment, the absorbency per unit weight of the composition may exceed the weighted average absorbency of the fine sorbent particulate and the coarse particulate by about 50% to about 350%. In either of the above embodiments, the coarse particulate may be diatomaceous earth. In a refinement, the composition may be self-clumping. In another refinement, the composition may have a dry density less than about 880 kg/m$^3$ (55 lb/ft$^3$).

In an embodiment, the dry density may be less than about 800 kg/m$^3$ (50 lb/ft$^3$). In another embodiment, the dry density may be less than about 673 kg/m$^3$ (42 lb/ft$^3$).

In an embodiment, the composition has an absorption greater than about 170%.

In an embodiment, the fine sorbent particulate may be sodium bentonite (conventional), hectorite, sodium-beneficiated calcium bentonite, attapulgite or combinations thereof.

In an embodiment, the coarse particulate may be zeolite.

In accordance with another aspect of the disclosure, a composition is disclosed. The composition may comprise discrete particles of diatomaceous earth. The composition may have a clump strength greater than about 75% and may have a dry density less than about 880 kg/m$^3$ (55 lb/ft$^3$). In a refinement, the dry density may be less than about 800 kg/m$^3$ (50 lb/ft$^3$). In another refinement, the dry density may be less than about 673 kg/m$^3$ (42 lb/ft$^3$).

In one embodiment, the composition may have an absorbency greater than about 170%. In another embodiment, the composition may have an absorbency from about 170% to about 500%. In yet another embodiment, the composition may have an absorbency from about 170% to about 400%.

In an embodiment, the composition may have a quartz content less than about 20%.

In an embodiment, the discrete particles of diatomaceous earth may contain a moisture content between about 5% to about 50%.

In an embodiment, the composition may further comprise sodium bentonite or hectorite. In another embodiment, the composition may further comprise sodium-beneficiated calcium bentonite, attapulgite, or combinations thereof.

In an embodiment, the composition may have an arsenic concentration less than about 17 ppm.

In an embodiment, the composition may further comprise zeolite.

In an embodiment, an absorbency per unit weight of the composition exceeds a weighted average absorbency by more than 100%. In another embodiment, the absorbency per unit weight of the composition may exceed the weighted average absorbency by about 10% to about 400%. In yet another embodiment, the absorbency per unit weight of the composition may exceed the weighted average absorbency by about 50% to about 350%.

In accordance with another aspect of the disclosure, a composition is disclosed. The composition may comprise a mixture of discrete particles of diatomaceous earth and discrete particles of sodium bentonite. The composition may be self-clumping, have a dry density less than about 800 kg/m$^3$ (50 lb/ft$^3$), and an absorbency in the range of about 170% to about 500%. In yet another embodiment, the composition may have an absorbency from about 170% to about 400%. In yet another embodiment, the composition may have an absorbency greater than about 170%. In one embodiment, the composition may have a quartz content less than about 15%.

In an embodiment, the composition may have a clump strength greater than about 75%.

In an embodiment, the composition may have an absorbency per unit weight, that exceeds a weighted average absorbency of the discrete particulates of diatomaceous earth and the discrete particulates of sodium bentonite by more than about 50%.

In an embodiment, the composition may further comprise zeolite.

In another embodiment, the composition may have a moisture content greater than about 2.5% and less than about 50%.

The features, functions, and advantages discussed above may be achieved independently in various embodiments or may be combined in yet other embodiments, further details of which can be seen with reference to the following descriptions.

DETAILED DESCRIPTION

The disclosed compositions each comprise a clumpable particulate combined with a non-clumpable particulate that may be finer (smaller sized), coarser (larger sized), or similarly sized as the clumpable particulate. As used herein, the term particulate refers to a quantity of material that is composed of discrete particles. Such discrete particles are individual particles that are not clustered or formed via agglomeration, extrusion, coatings, or the like.

The composition is a physical mixture or blend of the discrete particles of the clumpable and the non-clumpable particulates (components) such that the resulting composition is made up of individual particles that are not formed via agglomeration, extrusion, coatings, or other methods of forming composite particles.

In one embodiment, the composition self-clumps, self-solidifies, or agglomerates when wetted. The strength of the clumps is s that the clump remains as a singular clump after testing. The strength of the clumps be adjusted by the ratio of the clumpable particulate and the non-clumpable particulate. The strength of the clumps may also vary depending on the nature of the absorbed liquid and the time interval between particulate wetting and attempted clump removal. In one embodiment, the composition has clump strength of at least about 75%. In another embodiment, the composition has clump strength greater than about 80%. In other embodiments, the clump strength may be in the range of about 75% to about 95%. In some embodiments, the compositions may be self-clumping, have high clump strength greater than about 75%, a quartz content below 21%, a dry density below 945 kg/m$^3$ (59 lb/ft$^3$), and a water absorbency above about 170%. In one embodiment, the water absorbency of the composition may be about 170% to about 500%. In another embodiment, the water absorbency of the composition may be about 170% to about 400%.

Each composition is an example of loose particle packing. In the case in which the clumpable particulate is of a smaller particle size range than the non-clumpable particulate (component), the clumpable particulate at least partially fills the voids between the non-clumpable particles (of the non-clumpable particulate) in the composition. The extent to which the voids or interstitial volume of the non-clumpable particulate packing are filled with such smaller sized particles of the clumpable particulate can be controlled by adjusting the amount and the PSD of the smaller sized clumpable particulate. Loose packing of the larger sized non-clumpable particulate may provide voids for the expansion of such (smaller particle sized) clumpable particulate (component) while limiting the amount of stress applied by the weight of the composition overlying the clumpable particulate (component). This may enable the voids to store more liquid, while at the same time, provide a capillary function or a vehicle to transport the liquid into the voids.

In the case in which the non-clumpable particulate (component) is of a smaller particle size range than the clumpable particulate (component), the non-clumpable particulate at least partially fills the voids between the larger sized clumpable particles in the composition. Similar to that described above, the extent to which the voids or interstitial volume of the larger sized clumpable particulate packing are filled with the smaller sized non-clumpable particles can be controlled by adjusting the amount and the PSD of the smaller sized non-clumpable particulate.

As noted above, a clumpable particulate may be combined with either a finer, coarser, or similarly sized non-clumpable particulate. For all compositions, the particles of the clumpable particulate component will volumetrically expand outward and into the voids within the composition. One of the features of the non-clumpable particulate component is compressive strength. The non-clumpable particulate provides a structure or frame supported by individual particles that do not collapse after being wetted and that may provide sufficient space for the clumpable particulate component to expand when exposed to liquid. The non-clumpable particulate component acts to maintain pore channels allowing the particles of the clumpable particulate to access liquid as they expand in volume. As the clumpable particles expand and the free space between the expanding particles decreases, an overall increase in the total geometric volume the composition occupies may be observed.

As is known in the art, a particulate may be classified or graded as either fine or coarse based on its PSD. As disclosed herein, in one exemplary embodiment, a coarse (graded) clumpable particulate may be combined with either a fine or a coarse (graded) non-clumpable particulate. In another embodiment, a fine or a coarse clumpable particulate component may be combined with a non-clumpable particulate component of similar sizing. In yet another embodiment, a fine clumpable particulate may be combined with a fine or a coarse (graded) non-clumpable particulate. For example, in one embodiment a fine particulate may be combined with a coarse particulate. The fine particulate may have a PSD of 40%~99% within −10+60 screen sieve, 30%~60% within −10+20 screen sieve and 0~30% within −20+60 screen sieve. The coarse particulate may have a PSD that <3% pass −20 screen sieve, 5%~30% within −4+6 screen mesh, 20%~40% within −6+10 screen sieve and 20%-40% within −10+20 screen sieve. As used herein, all sieve sizes are given in terms of Tyler mesh values (W.S. Tyler Industrial Group, USA).

In the exemplary embodiment described above, the fine particulate may be a fine sorbent particulate selected from the group consisting of sodium bentonite, attapulgite, hectorite, sodium-beneficiated calcium bentonite, and combinations thereof and may have a PSD of 40%~99% within −10+60 screen sieve, 30%~60% within −10+20 screen sieve, and 0~30% within −20+60 screen sieve. The coarse particulate may comprise a porous or non-porous granular material with high compressive strength and may, in such exemplary embodiment, be selected from the group consisting of diatomaceous earth, zeolite, bentonite (for example, calcium bentonite), montmorillonite (for example, calcium montmorillonite), crushed limestone, and combinations thereof. The coarse particulate may have a PSD that <3% pass −20 screen sieve, 5%~30% within −4+6 screen mesh, 20%~40% within −6+10 screen sieve and 20%-40% within −10+20 screen sieve. In some embodiments, the preferred PSD for either the fine (graded) sorbent (clumpable) particulate or coarse particulate may be about −4 to about +60 mesh. As discussed above, other combinations may be used. For example, in some embodiments, a DE particulate may be mixed with a finer particulate to form the composition.

The disclosed compositions have a surprising absorbency that is greater than about ~1.1 to 9.6 times the individual absorbency of the clumpable or non-clumpable particulates. The disclosed compositions also demonstrate an unexpected absorbency that exceeds the value that would be expected from a rule of mixtures calculation. To quantify the surprising increase in absorbency, the term "absorption benefit" is used. The absorption benefit is calculated by dividing the measured absorption by the rule of mixtures theoretical value and then multiplying that value by 100 to yield a percentage value. The absorption benefit is indicative of the percent absorbency gain above what the rule of mixtures predicts for a given mixture. The rule of mixtures is often employed to predict the behavior of a system and can be used to calculate the weighted average of a particular metric based on each component's individual value for that metric. A weighted average may be considered on the basis of different parameters such as number, mass, volume, or surface area. In one embodiment, the rule of mixtures was employed on a mass basis; however, the effect is also observed on a volume basis and may also be observed with respect to other bases. For example, in one embodiment, the rule of mixtures absorbency per unit weight of a composition having a first quantity of a clumpable particulate (with a first absorbency per unit weight) and a second quantity of a non-clumpable particulate (with a second absorbency per unit weight) was the weighted average of the first and second absorbencies per unit weight. As discussed above, in one such embodiment, the weighting may be based on the mass of the quantity of each type of particulate in relation to the total composition mass.

The disclosed compositions also demonstrated a surprising reduction in dry density in contrast to the value expected from a rule of mixtures calculation. To quantify the surprising decrease in dry density, the term "density benefit" is used. The density benefit is calculated by subtracting the measured dry density from the rule of mixtures theoretical value for dry density, dividing that difference by the rule of mixtures value, and then multiplying that, value by 100 to yield a percentage value. The density benefit is indicative of the percent density reduction of the dry density expected from a rule of mixtures calculation for dry density.

In one embodiment, an absorbent resulting composition may include a sodium bentonite as the clumpable sorbent particulate and a low density DE as the non-clumpable particulate. The low density BE serves as an absorbing component, a structural component, and it provides a capillary function. The combination of the non-clumpable particulate (in this case, DE) and the clumpable particulate (in this case, sodium bentonite) may create a structural support framework such that the non-clumpable particulate component may reduce the pressure on the clumpable component, thereby increasing the functional absorbance capacity of the clumpable particulate component. In addition, the capillary function of the porous DE may transport the liquid into interstitial voids of the particulate packing until they are saturated with liquid or no more liquid is available.

Surprisingly, the disclosed compositions create a synergistic absorption in which the absorbency is about 1~2 times greater than expected absorbency of the clumpable particulate (in one embodiment, sodium bentonite) and the non-clumpable particulate (in one embodiment, DE) based on the rule of mixtures. The absorbency and absorption benefit will vary depending on the nature of the particulate components selected such as the structure of the material, purity, particle size, particle size distribution, and weight ratio of particulate components. The rate of absorption and retention of the absorbed liquid may also affect the overall absorption measured.

In the following examples, compositions comprising clumpable and non-clumpable particulate components are provided to illustrate the absorption benefit which indicates the measured increased water absorption of the composition blend in excess of the predicted absorption determined by the rule of mixtures.

The clays, DE, and zeolites utilized in the following examples are obtained from natural sources and are therefore subject to variation in physical properties. Synthetic zeolites may also have variation due to processing conditions. Variation in the form and structure of a particulate material may give rise to differences in observed and measured behavior.

Typical characteristics of the particulates used in the following examples are listed in Table 1. PSD was determined using a Ro-Tap® sieve shaker with Tyler mesh sieves (W.S. Tyler Industrial Group, USA) and a mass balance with 0.01 g resolution. The dry density, also known as the tap density, is the close packed density of the material. The dry density is measured by filling a known volume with a known mass of material followed by repeated tapping of the container until the material no long decreases in volume (e.g. when no more interstitial volume can be removed). Auto-tap™ equipment such as the AT-6-110-60 (Quantachrome Instruments, USA) can be employed to increase measurement repeatabilty.

Absorbency (absorption) was determined using water and an immersion method. According to the immersion method, a pre-determined mass of the blended mixture, here 20 g, is immersed in water for 20 minutes and then removed and drained for 20 minutes. The mass difference of the blend composition before and after immersion is divided by the initial mass and multiplied by 100 to yield a percentage value.

Self-clumping is a qualitative assessment of the composition's ability to form a clump when wetted and is qualified as either a "yes" or a "no". A "yes" for self-clumping indicates that a singular clump was formed but the measure does not infer any indication as to the integrity of the clump also described as its clump strength. A "no" for self-clumping indicates that a singular clump was not formed under the testing conditions. Self-clumping and clump strength were measured using synthetic urine comprised of 4 ml ammonium hydroxide (28% w/w), 775 ml of 0.100 M calcium chloride, 100 g urea, and a volume of distilled or deionized water to create a 1 liter solution. Concentrated hydrochloric acid was added drop-wise to achieve a pH ~6. To determine whether the composition self-clumps and, if so, its corresponding clump strength, 10 ml (0.34 fluid oz) of synthetic urine was poured onto on a ~5 cm (2 inch) thick bed of sample. After resting for one minute, the clump, if formed, was removed, weighed, agitated for five seconds on a sieve in a Ro-Tap® sieve shaker (W.S. Tyler Industrial Group, USA), and then reweighed. A 6.35 mm (¼ inch) mesh sieve was used. Clump strength is the percentage of the mass of the original clump retained after Ro-Tap® agitation in relation to the initial clump mass. A value of zero was assigned for clump strength if the clump broke into two or more pieces during the test, despite the possible presence of larger pieces remaining. If an initial clump did not form, then the clump strength is given as "N/A" or not applicable. A higher value of clump strength is desirable.

Moisture of particulates and compositions of such particulates was measured by weighing 10 g of material in a metal pan of known mass and then placing both in an oven at a temperature of at least 105° C. (221° F.) but less than 400° C. (752° F.) for at least eight hours. Afterwards, the pan and materials were allowed to cool for a short time to room temperature prior to measuring. The mass difference before and after drying divided by the initial material mass (e.g. 10 g) could then be used to calculate the percent mass lost due to moisture (the "moisture %") by multiplying by 100.

Quartz concentration can be measured via analysis of crystal diffraction patterns detected by a diffractometer. Here, analysis was performed using JADE 5 software (X-ray diffraction software from Materials Data Incorporated™, USA) of diffraction patterns obtained on D500 diffractometer (Siemens® (now Bruker®)).

Compressive strength is measured by filling a known volume with material and applying uniform force across the geometric surface of the material volume. The compressive strength is measured as the force required to compress the material by 2.5 cm (1 inch) and is measured in units of kilopascals (kPa) (and pounds per square inch (psi)).

TABLE 1

Typical Characteristics Of Material, Used in the Examples

| | Sodium Bentonite | | Diatomaceous Earth | | | | Zeolite | |
|---|---|---|---|---|---|---|---|---|
| | Wyo- | Wyo- | EPM | EPM | EPM | EPM | | |
| | Ben™ BH-8 | Ben™ BH-30 | Blue Ribbon | Ultra Sorb | Floor Dry | Solid-A-Sorb | KMI −8+14 | KMI −20+50 |
| Screen size +4 | 0.75 | 0.00 | 1.31 | 0.02 | 0.00 | 0.00 | 0.00 | 0.00 |
| −4/+6 | 7.75 | 0.08 | 36.49 | 10.66 | 3.68 | 0.00 | 0.00 | 0.00 |
| −6/+10 | 45.33 | 0.02 | 40.92 | 45.58 | 53.07 | 0.00 | 21.05 | 0.02 |
| −10/+20 | 41.96 | 71.90 | 19.62 | 38.87 | 42.41 | 0.10 | 77.90 | 1.25 |
| −20/+30 | 1.11 | 21.35 | 0.90 | 2.04 | 0.28 | 31.78 | 0.25 | 24.67 |
| −30/+60 | 2.05 | 6.32 | 0.33 | 1.87 | 0.37 | 67.65 | 0.41 | 58.33 |
| −60 | 1.05 | 0.33 | 0.43 | 0.96 | 0.19 | 0.47 | 0.39 | 15.73 |
| Dry density, kg/m³ (lb fit³) | 1105 (69) | 1137 (71) | 464 (29) | 432 (27) | 432 (27) | 513 (32) | 929 (58) | 1089 (68) |
| (Water) absorbency, % | 149 | 150 | 83 | 90 | 107 | 174 | 31 | 35 |
| Self-clumping | Yes | Yes | No | No | No | No | No | Yes |
| Clump strength, % | 94 | 97 | N/A | N/A | N/A | N/A | N/A | 0 |
| Moisture, % | 8.3 | 6.6 | 1.4 | 3.3 | 1.2 | 0 | 6.0 | 6.6 |
| Quartz content, % | 8.3 | 7.8 | 1 | 0.5 | 0.1 | 0.2 | | |
| Compressive strength, kPa (psi) | 889 (129) | 1076 (156) | 1262 (183) | 1351 (196) | 1076 (156) | 1172 (170) | 2868 (416) | 2779 (403) |

Sodium bentonite, hectorite, attapulgite, sodium-beneficiated calcium bentonite, and combinations thereof, and other clumping clays may be used for the clumping particulate of the composition. In one exemplary embodiment, the clumping particulate may have a PSD predominantly within about −4 mesh to about +100 mesh. In another embodiment, the clumping particulate may have a PSD predominantly within about −4 mesh to about +60 mesh. The non-clumping particulate may be ground and classified to the desired size fractions for maximum clump strength.

The non-clumping particulate of the composition may be a material with low dust and low density or other attractive properties, such as odor adsorption, and may include one or more of diatomaceous earth, zeolite, attapulgite, calcium bentonite, montmorillonite, crushed limestone or other crystalline or amorphous mineral or synthetic materials. In an embodiment, the non-clumping particulate may have a PSD predominantly within about −4 to about +100 mesh. In another embodiment the non-clumping particulate may have a PSD predominantly within about −4 mesh to about +60 mesh, although additional particle sizes can be effective.

A non-clumping particulate may provide a support that does not collapse after wetting for continued volumetric growth of the clumping particulate component and particle access to liquid. The compressive strength of the non-clumping particulate can either be a natural property of the material or can result from a thermal treatment or calcination (~37.8° C. (100° F.) to ~760.0° C. (1400° F.)). In some embodiments, the non-clumping particulate may be calcined without flux (not flux-calcined). Examples of non-clumping particulates that have been calcined without flux (although, in some embodiments, they may be heated to a temperature below the softening and calcining temperature of diatomite) include EPM's FloorDry™ (DE), Blue Ribbon™ (DE), Solid-A-Sorb® (DE), Ultra Sorb™ (DE) and Red Diamond™ (calcium bentonite). More specifically, in one embodiment, the non-clumping particulate may be a natural diatomaceous earth that has been thermally treated at a temperature range of about 37.8° C. (100° F.)~760.0° C. (1400° F.). Such non-clumping DE particulate component may also have an absorbency greater than about 50% by mass, and a compressive strength of about 345 kPa (50 psi) to about 1380 kPa, (200 psi), and may have a resistance to slacking of less than 5%.

In an embodiment, the DE particulate component may be free of flux (has not been treated with flux). Further, in an embodiment, the disclosed composition may also be free of flux (neither the composition or any of its components has been treated with flux or flux calcined). In other embodiments, the non-clumping particulate may be uncalcined. In another embodiment, zeolite may be added to the composition as a partial replacement for one of the two other particulate components. For example, sodium bentonite as the clumping particulate and diatomaceous earth as the non-clumping particulate may be combined with natural zeolite as a third component. The natural zeolite may also be mixed together with the clumping component to provide for odor control.

In a further embodiment, the composition may comprise sodium bentonite that has a water absorbency of about 90~185% by mass as the clumping particulate, and diatomaceous earth as the non-clumping particulate that is fresh water or marine diatomaceous earth and that has a Brunauer-Emmett-Teller (BET) specific surface area of about 15~80 m²/g and a porosity (pore volume) of about 2.0~4.0 ml/g. Physisorption is a common method to measure both surface area and porosity. Physisorption measures the amount of adsorbate, an inert gas commonly nitrogen or carbon dioxide, adsorbed on the surface of a adsorbent particle across a range of pressures at a specific temperature. Based on the measured volume of gas during adsorption, the BET equation can be used to calculate the specific surface area or the surface area per unit mass. The pore volume can be calculated using the measured volume of gas that completely filled the adsorbent pores and the density of the gas. The adsorption of nitrogen gas on diatomaceous earth can be measured on a Micromeritics® TriStar® II 3020 analyzer (Micromeritics®, USA) at the boiling point of liquid nitrogen 77 Kelvin. The associated software developed by Micromeritics® can be used to calculate the BET surface area and porosity.

In another embodiment, the composition may have a weight ratio of the non-clumping particulate to clumping particulate ranging between about 15:85 to about 85:15.

In another embodiment, the composition may contain elemental arsenic in a concentration less than about 17 ppm.

In another embodiment, the composition may contain quartz in a concentration less than about 20%. In some embodiments, the quartz content may be less than about 15%. In other embodiments, the quartz content of the disclosed novel compositions may be less than about 8%.

In another embodiment, dustiness may be reduced by adding water to diatomaceous earth at an additional level of at least about 5% by weight of the initial particulate mass. Furthermore, the dustiness may be reduced by adding water at about 10-15% or more by weight to the non-clumping diatomaceous earth particulate component. Addition of water in excess of 20% by weight is effective in suppressing dust. Water addition may be achieved by spraying a fine mist of water onto the non-clumping particulate or by other methods commonly used to apply water to particulate materials. A mixing mechanism may be applied to mix the spray water into the non-clumping particulate. Water in the form of mist may prevent arrest the fine particles of the non-clumping particulate and thus preventing those fine particles from becoming airborne. The non-clumping particulate, the clumping particulate, and the resulting composition are free of any dry or powdered de-dusting agent. More specifically, a dry or powdered de-dusting agent is not added to the composition or to the clumping or non-clumping particulates. Moreover, the disclosed composition is free of (does not include) filler particles to which an aqueous slurry of a deodorizing agent has been added in order to adhere a dry or powdered de-dusting agent to such filler particles.

In some embodiments the composition may be entirely or substantially free of calcium bentonite when one of the particulate components of the composition is sodium bentonite. In some embodiments, the composition may be entirely free or substantially free of sodium-beneficiated calcium bentonite when one of the particulate components of the composition is conventional sodium bentonite. In some embodiments the composition may be entirely or substantially free of zeolite when one of the particulate components of the composition is sodium bentonite. In some embodiments, the composition may be entirely or substantially free of cellulosic material. In some embodiments, the composition is entirely or substantially free of cellulose-based filler material. In other embodiments, the composition is entirely or substantially free of cellulose-based finer material when one of the particulate components of the composition is sodium bentonite.

In an embodiment, the non-clumping particulate is not treated with (is free of) polytetrafluoroethylene. In an embodiment, the disclosed composition is free of polytetrafluoroethylene. Furthermore, in some embodiments that include a sodium bentonite particulate, the sodium bentonite particulate has not been treated with a fragrance slurry or the like. In other words, fragrance has not been added to the sodium bentonite particulate (the sodium bentonite is free of fragrance treatment). In some embodiments, the disclosed composition may be free of fragrance treatment.

In some embodiments, in which one of the particulate components of the composition is a bentonite particulate, the composition is free of organic sorbents such as cellulosic materials, including straw and cellulose fibers, and polyacrylates. In an embodiment, in which one of the particulate components of the composition is a bentonite particulate, the bentonite has not undergone an ion exchange treatment using an alkaline metal, and thus the disclosed composition is non-swelling.

In some embodiments in which one of the particulate components of the composition is DE, the amount of DE (in the resulting composition) may be greater than 15%.

In an embodiment, the composition may be entirely or substantially free of a galactomannan gum (e.g. guar gum, locust bean gum, and their derivatives). In some embodiments, the composition may be entirely or substantially free of a galactomannan gum (e.g. guar gum, locust bean gum, and their derivatives) when one of the particulate components of the composition is DE. In other embodiments, the composition may be entirely or substantially free of any one or more of borax, xantham gum, carrageenan gum, or alginate. In other embodiments, the composition may be entirely or substantially free of any one or more of borax, xantham gum, carrageenan gum, or alginate when one of the particulate components of the composition is DE. In some embodiments, but not all, the composition may be entirely or substantially free of any one or more of borax, xantham gum, carrageenan gum, or alginate when one of the particulate components of the composition is attapulgite or montmorillonite. In some embodiments, the composition may be entirely or substantially free of a galactomannan gum (e.g. guar gum, locust bean gum, and their derivatives) when one of the particulate components of the composition is attapulgite or montmorillonite.

In an embodiment, the absorbency per unit weight of the composition may exceed a weighted average absorbency by more than about 10% (see absorption benefit). In another embodiment, the absorbency per unit weight of the composition may exceed the weighted average absorbency by about 10% to about 400%. In yet another embodiment, the absorbency per unit weight of the composition may exceed the weighted average absorbency by about 50% to about 350%. In yet another embodiment, the absorbency per unit weight of the composition may exceed the weighted average absorbency by about 100% to about 325%.

In one embodiment, the composition may have an absorbency greater than about 170%. In another embodiment, the composition may have an absorbency from about 160% to about 500%. In yet another embodiment, the composition may have an absorbency from about 170% to about 400%.

The following exemplary compositions generally describe possible different binary and ternary combinations of clumping and non-clumping components; however, the number of combinations will increase as the number of components is increased. Those combinations will be apparent to those skilled in the art.

EXAMPLES

Example 1

A clumping sorbent particulate, sodium bentonite (Wyo-Ben™ Big Horn® 8 (BH-8)), was thoroughly mixed with a non-clumping particulate, diatomaceous earth (EPM Blue Ribbon™) in weight ratios of 0:100, 30:70, 50:50, 70:30 and 100:0. Water absorbency, absorption benefit, dry density, density benefit, moisture, self-clumping, and clump strength were evaluated as previously described. The results are listed in Table 2.

TABLE 2

Typical Properties Of Sodium Bentonite (BH-8) Mixed With
Diatomaceous Earth (Blue Ribbon ™) At Various Weight Ratios

| | Sodium Bentonite (BH-8):Diatomaceous Earth (Blue Ribbon ™) Ratio | | | | |
|---|---|---|---|---|---|
| | 0:100 | 30:70 | 50:50 | 70:30 | 100:0 |
| Water Absorbency, % | 83 | 233 | 309 | 329 | 149 |
| Absorption Benefit, % | N/A | 227 | 266 | 255 | N/A |
| Dry Density, kg/m$^3$ | 464 | 513 | 673 | 801 | 1105 |
| (lb/ft$^3$) | (29) | (32) | (42) | (50) | (69) |
| Density Benefit, % | N/A | 22 | 14 | 12 | N/A |
| Moisture, % | 1 | 5 | 6 | 7 | 8 |
| Self-clumping | No | Yes | Yes | Yes | Yes |
| Clump strength, % | N/A | 0 | 0 | 81 | 94 |

Surprisingly, the absorbency of each mixture is 1.6-4.0 times that of individual fractions and over 200% the expected absorbency based on the rule of mixtures. A density benefit up to about 22% was also observed and was greatest at a sodium bentonite to diatomaceous earth ratio of 30:70. Although all blends clumped when wetted, high clump strength was observed at higher sodium-bentonite levels. Of the tested ratios, the greatest absorption benefit appears to be reached at a sodium bentonite to diatomaceous weight ratio of about 50:50 but very high absorbency appears to be reached at a weight ratio of 70:30. Thus, higher absorbency with good clump strength can be obtained when using diatomaceous earth and sodium bentonite while maintaining a relatively low density.

Example 2

A clumping particulate, sodium bentonite (Wyo-Ben™ BH-8), was thoroughly mixed with a non-clumping particulate, diatomaceous earth (EPM Ultra Sorb™), in ratios of 0:100, 30:70, 50:50, 70:30 and 100:0. Water absorbency, absorption benefit, dry density, density benefit, moisture, self-clumping, and clump strength were evaluated as previously described. The results are shown in Table 3.

TABLE 3

Typical Properties Of Sodium Bentonite (BH-8) Mixed With
Diatomaceous Earth (EPM Ultra Sorb ™) At Various Weight Ratios

| | Sodium Bentonite (BH-8):Diatomaceous Earth (Ultra Sorb ™) Ratio | | | | |
|---|---|---|---|---|---|
| | 0:100 | 30:70 | 50:50 | 70:30 | 100:0 |
| Water Absorbency, % | 90 | 251 | 335 | 328 | 149 |
| Absorption Benefit, % | N/A | 233 | 280 | 250 | N/A |
| Dry Density, kg/m$^3$ | 432 | 577 | 625 | 801 | 1105 |
| (lb/ft$^3$) | (27) | (36) | (39) | (50) | (69) |
| Density Benefit, % | N/A | 9 | 19 | 11 | N/A |
| Moisture, % | 3 | 4 | 5 | 6 | 8 |
| Self-clumping | No | No | Yes | Yes | Yes |
| Clump strength, % | N/A | N/A | 0 | 87 | 94 |

Increased water absorbency beyond the rule of mixtures was obtained. Specifically, each mixture has an absorbency that is 1.7~3.7 times that of individual fractions and over 200%, nearly 300%, the expected absorbency based on the rule of mixtures. Of the tested ratios, the greatest absorbency and absorption benefit appears to be reached at a bentonite to DE ratio of about 50:50. A density benefit up to about 20% was also observed and was greatest at a sodium bentonite to diatomaceous earth ratio of 50:50. Although all blends clumped when wetted, high clump strength was only observed at higher sodium-bentonite levels. Thus, higher absorbency with good clump strength can be obtained when using diatomaceous earth and sodium bentonite while maintaining a relatively low density.

Example 3

The clumping particulate, sodium bentonite (Wyo-Ben™ BH-8), was thoroughly mixed with the non-clumping particulate, diatomaceous earth (EPM Floor Dry™), in ratios of 0:100, 30:70, 50:50, 70:30 and 100:0. Water absorbency, absorption benefit, dry density, density benefit, moisture, self-clumping, and clump strength were evaluated as previously described. The results are shown in Table 4.

TABLE 4

Typical Properties Of Sodium Bentonite (BH-8) Mixed With
Diatomaceous Earth (EPM Floor Dry ™) At Various Weight Ratios

| | Sodium Bentonite (BH-8):Diatomaceous Earth (Floor Dry ™) Ratio | | | | |
|---|---|---|---|---|---|
| | 0:100 | 30:70 | 50:50 | 70:30 | 100:0 |
| Water Absorbency, % | 107 | 234 | 332 | 365 | 149 |
| Absorption Benefit, % | N/A | 196 | 259 | 268 | N/A |
| Dry Density, kg/m$^3$ | 432 | 529 | 641 | 753 | 1105 |
| (lb/ft$^3$) | (27) | (33) | (40) | (47) | (69) |
| Density Benefit, % | N/A | 17 | 17 | 17 | N/A |
| Moisture, % | 1 | 4 | 5 | 6 | 8 |
| Self-clumping | No | Yes | Yes | Yes | Yes |
| Clump strength, % | N/A | 0 | 0 | 85 | 94 |

Increased water absorbency beyond the rule of mixtures was obtained. Specifically, each mixture has an absorbency that is 1.6~3.4 times that of individual fractions. Absorption benefits over 200%, and in some ratios over 300%, the expected absorbency based on the rule of mixtures was measured. Of the tested ratios, the greatest absorbency and absorption benefit appears to be reached at a bentonite to DE ratio of about 70:30. A density benefit of about 17% was also observed for all blends. Thus, higher absorbency with good clump strength can be obtained when using diatomaceous earth and sodium bentonite while maintaining a relatively low density.

Example 4

A non-clumping particulate, such as DE as previously described with PSD predominantly within −4 to +20 mesh, may also be blended with a clumping particulate that has a smaller PSD predominantly within −10 to +60 mesh. Clumping sodium bentonite (Wyo-Ben™ Big Horn® 30 (BH-30)) was mixed with EPM Blue Ribbon™, Ultra Sorb™ and Floor Dry™ diatomaceous earth (coarse non-clumping particulates) in weight ratios of 0:100, 30:70, 50:50, 70:30 and 100:0. Water absorbency, absorption benefit, dry density, density benefit, moisture, self-clumping, and clump strength were evaluated as previously described. The results for BH-30 blended with Blue Ribbon™, Ultra Sorb™ and Floor Dry™ are presented in Table 5 through Table 7, respectively.

TABLE 5

Typical Properties of Sodium Bentonite (Wyo-Ben™ BH-30) Mixed with Diatomaceous Earth (EPM Blue Ribbon™) at Various Weight Ratios

| | Sodium Bentonite (BH-30):Diatomaceous Earth (Blue Ribbon™) Ratio | | | | |
|---|---|---|---|---|---|
| | 0:100 | 30:70 | 50:50 | 70:30 | 100:0 |
| Water Absorbency, % | 83 | 223 | 279 | 243 | 150 |
| Absorption Benefit, % | N/A | 216 | 239 | 187 | N/A |
| Dry Density, kg/m$^3$ | 464 | 577 | 705 | 833 | 1121 |
| (lb/ft$^3$) | (29) | (36) | (44) | (52) | (70) |
| Density Benefit, % | N/A | 13 | 11 | 10 | N/A |
| Moisture, % | 1 | 4 | 5 | 6 | 7 |
| Self-clumping | No | Yes | Yes | Yes | Yes |
| Clump strength, % | N/A | 0 | 88 | 93 | 97 |

TABLE 6

Typical Properties of Sodium Bentonite (Wyo-Ben™ BH-30) Mixed with Diatomaceous Earth (EPM Ultra Sorb™) at Various Weight Ratios

| | Sodium Bentonite (BH-30):Diatomaceous Earth (Ultra Sorb™) Ratio | | | | |
|---|---|---|---|---|---|
| | 0:100 | 30:70 | 50:50 | 70:30 | 100:0 |
| Water Absorbency, % | 90 | 237 | 294 | 245 | 150 |
| Absorption Benefit, % | N/A | 219 | 245 | 186 | N/A |
| Dry Density, kg/m$^3$ | 432 | 577 | 657 | 817 | 1121 |
| (lb/ft$^3$) | (27) | (36) | (41) | (51) | (70) |
| Density Benefit, % | N/A | 10 | 16 | 11 | N/A |
| Moisture, % | 3 | 4 | 5 | 5 | 7 |
| Self-clumping | No | Yes | Yes | Yes | Yes |
| Clump strength, % | N/A | 0 | 88 | 96 | 97 |

TABLE 7

Typical Properties of Sodium Bentonite (Wyo-Ben™ BH-30) Mixed with Diatomaceous Earth (EPM Floor Dry™) at Various Weight Ratios

| | Sodium Bentonite (BH-30):Diatomaceous Earth (Floor Dry™) Ratio | | | | |
|---|---|---|---|---|---|
| | 0:100 | 30:70 | 50:50 | 70:30 | 100:0 |
| Water Absorbency, % | 107 | 258 | 403 | 319 | 150 |
| Absorption Benefit, % | N/A | 215 | 314 | 233 | N/A |
| Dry Density, kg/m$^3$ | 432 | 545 | 657 | 785 | 1121 |
| (lb/ft$^3$) | (27) | (34) | (41) | (49) | (70) |
| Density Benefit, % | N/A | 14 | 15 | 15 | N/A |
| Moisture, % | 1 | 3 | 5 | 5 | 7 |
| Self-clumping | No | Yes | Yes | Yes | Yes |
| Clump strength, % | N/A | 0 | 93 | 95 | 97 |

Increased water absorbency beyond the rule of mixtures was observed for a finer sodium bentonite blended with a coarser diatomaceous earth. Specifically, each mixture has an absorbency that is 1.9~3.8 times that of individual fractions. In an embodiment, an absorption benefit in excess of 300% was observed. Of the tested ratios, the greatest absorbency and absorption benefit appears to be reached at a bentonite to diatomaceous earth ratio of about 50:50. A density benefit up to about 16% was also observed and was greatest at a sodium bentonite to diatomaceous earth ratio of 50:50. Thus, higher absorbency with good clump strength can be obtained when using diatomaceous earth and sodium bentonite while maintaining a relatively low density.

Example 5

EPM Solid-A-Sorb® was thoroughly mixed in weight ratios of 0:100, 30:70, 50:50, 70:30 and 100:0 with sodium bentonite (Wyo-Ben™ BR-8 and BH-30) individually. After, water absorbency, absorption benefit, dry density, density benefit, moisture, self-clumping, and clump strength were evaluated as previously described. Data pertaining to the aforementioned blends are shown in Table 8 and Table 9.

TABLE 8

Typical Properties of Sodium Bentonite (Wyo-Ben™ BH-8) Mixed with Diatomaceous Earth (EPM Solid-A-Sorb®) at Various Weight Ratios

| | Sodium Bentonite (BH-8):Diatomaceous Earth (Solid-A-Sorb®) Ratio | | | | |
|---|---|---|---|---|---|
| | 0:100 | 30:70 | 50:50 | 70:30 | 100:0 |
| Water Absorbency, % | 174 | 278 | 336 | 371 | 149 |
| Absorption Benefit, % | N/A | 167 | 208 | 237 | N/A |
| Dry Density, kg/m$^3$ | 513 | 595 | 721 | 865 | 1107 |
| (lb/ft$^3$) | (32) | (37) | (45) | (54) | (69) |
| Density Benefit, % | N/A | 14 | 11 | 6 | N/A |
| Moisture, % | 0 | 4 | 5 | 5 | 8 |
| Self-clumping | Yes | Yes | Yes | Yes | Yes |
| Clump strength, % | 0 | 0 | 0 | 0 | 94 |

TABLE 9

Typical Properties of Sodium Bentonite (Wyo-Ben™ BH-30) Mixed with Diatomaceous Earth (EPM Solid-A-Sorb®) at Various Weight Ratios

| | Sodium Bentonite (BH-30):Diatomaceous Earth (Solid-A-Sorb®) Ratio | | | | |
|---|---|---|---|---|---|
| | 0:100 | 30:70 | 50:50 | 70:30 | 100:0 |
| Water Absorbency, % | 174 | 245 | 314 | 302 | 150 |
| Absorption Benefit, % | N/A | 147 | 194 | 192 | N/A |
| Dry Density, kg/m$^3$ | 513 | 560 | 689 | 833 | 1121 |
| (lb/ft$^3$) | (32) | (35) | (43) | (52) | (70) |
| Density Benefit, % | N/A | 19 | 15 | 11 | N/A |
| Moisture, % | 0 | 2 | 4 | 5 | 7 |
| Self-clumping | Yes | Yes | Yes | Yes | Yes |
| Clump strength, % | 0 | 0 | 87 | 95 | 97 |

Both the coarser and finer sodium bentonite exhibited a synergistic absorbance with the DE particulate. Of the tested ratios, absorption benefits of about 150% to 250% were measured with greatest absorbencies observed at a bentonite to DE ratio of 50:50 and 70:30. A density benefit up to about 19% was also observed and was greatest at a sodium bentonite to diatomaceous earth ratio of 70:30. The BH-8 sodium bentonite and DE blend clumped when wetted; however, none of the blends demonstrated high clump strength. In contrast, the BH-30 sodium bentonite and diatomaceous earth blend demonstrated both self-clumping for all ratios but with high clump strengths at a sodium bentonite level of at least 50%. Thus, higher absorbency with good clump strength can be obtained when using diatomaceous earth and sodium bentonite while maintaining a relatively low density.

Example 6

EPM Ultra Sorb™ was sieved to produce material of narrower PSD including −4+6, −6+10, −10+20, −20+30, and −30+60. Individual fractions of Ultra Sorb™ were thoroughly mixed in weight ratios of 0:100, 30:70, 50:50, 70:30 and 100:0 with sodium bentonite. Each fraction was blended with Wyo-Ben™ BH-8 and BH-30 individually and their water absorbency, absorption benefit, dry density, density benefit, moisture, self clumping, and clump strength were evaluated as previously described. Data for the Ultra Sorb™ fractions blended with BH-8 and BH-30 are listed in Table 10 and Table 11 respectively.

TABLE 10

Typical Properties of Sodium Bentonite (Wyo-Ben ™ BH-8) Mixed with Diatomaceous Earth (Ultra Sorb ™) of Different, Sizing at a Weight Ratio of 50:50

| | Ultra Sorb ™ Screened Size | | | | |
|---|---|---|---|---|---|
| | −4 + 6 | −6 + 10 | −10 + 20 | −20 + 30 | −30 + 60 |
| Water Absorbency, % | 298 | 281 | 302 | 323 | 343 |
| Absorption Benefit, % | 251 | 235 | 226 | 205 | 197 |
| Self-clumping | Yes | Yes | Yes | Yes | Yes |
| Clump strength, % | 84 | 75 | 0 | 0 | 0 |

TABLE 11

Typical Properties of Sodium Bentonite (Wyo-Ben ™ BH-30) Mixed with Diatomaceous Earth (Ultra Sorb ™) of Different Sizing at a Weight Ratio of 50:50

| | Ultra Sorb ™ Screened Size | | | | |
|---|---|---|---|---|---|
| | −4 + 6 | −6 + 10 | −10 + 20 | −20 + 30 | −30 + 60 |
| Water Absorbency, % | 290 | 331 | 347 | 386 | 372 |
| Absorption Benefit, % | 243 | 275 | 259 | 244 | 212 |
| Self-clumping | Yes | Yes | Yes | Yes | Yes |
| Clump strength, % | 84 | 91 | 95 | 94 | 85 |

Surprisingly, non-clumping components of similar composition that have undergone equivalent processing have varying absorption benefits depending on the particulate size in relation to the clumping component's PSD. For differently sized clumping clay, such as sodium bentonite Wyo-Ben™ BH-8 and BH-30, the absorption benefit was greatest when blended with a non-clumping component with a narrow PSD of the same size as the largest particulate size of the clumping component. As the narrow PSD of the non-clumping component decreases, the absorption benefit decreases. This phenomenon may be related to the non-clumping component's ability to create a loose packing, to draw water into the inter-particle free space, and to support the overall structure. Thus, higher absorbency with good clump strength can be obtained when using diatomaceous earth and sodium bentonite.

Example 7

The non-clumping component may also be a zeolite. Zeolites may be utilized for their odor control ability. A non-clumping particulate, zeolite marketed by KMI Zeolite™ (KMI) sieved to −8+14 mesh, was thoroughly mixed in weight ratios of 0:100, 30:70, 50:50, 70:30 and 100:0 with sodium bentonite. The course zeolite particulates were blended with Wyo-Ben™ BH-8 and BH-30 individually and their water absorbency, absorption benefit, dry density, density benefit, moisture, self-clumping, and clump strength were evaluated as previously described. The results are listed in Table 12 and Table 13.

TABLE 12

Typical Properties of Sodium Bentonite (Wyo-Ben ™ BH-8) Mixed with Zeolite (KMI Zeolite −8 + 14) at Various Weight Ratios

| | Sodium Bentonite (BH-8):Zeolite (−8 + 14) Ratio | | | | |
|---|---|---|---|---|---|
| | 0:100 | 30:70 | 50:50 | 70:30 | 100:0 |
| Water Absorbency, % | 31 | 174 | 248 | 111 | 149 |
| Absorption Benefit, % | N/A | 262 | 276 | 239 | N/A |
| Dry Density, kg/m³ (lb/ft³) | 929 (58) | 976 (61) | 996 (62) | 1074 (67) | 1107 (69) |
| Density Benefit, % | N/A | 1 | 2 | −2 | N/A |
| Moisture, % | 6 | 6 | 7 | 7 | 8 |
| Self-clumping | No | No | Yes | Yes | Yes |
| Clump strength, % | N/A | N/A | 0 | 0 | 94 |

TABLE 13

Typical Properties of Sodium Bentonite (Wyo-Ben ™ BH-30) Mixed with Zeolite (KMI Zeolite −8 + 14) at Various Weight Ratios

| | Sodium Bentonite (BH-30):Zeolite (−8 + 14) Ratio | | | | |
|---|---|---|---|---|---|
| | 0:100 | 30:70 | 50:50 | 70:30 | 100:0 |
| Water Absorbency, % | 31 | 183 | 222 | 299 | 150 |
| Absorption Benefit, % | N/A | 274 | 245 | 262 | N/A |
| Dry Density, kg/m³ (lb/ft³) | 929 (58) | 945 (59) | 993 (62) | 1071 (67) | 1121 (70) |
| Density Benefit, % | N/A | 4 | 3 | −1 | N/A |
| Moisture, % | 7 | 6 | 6 | 6 | 7 |
| Self-clumping | No | Yes | Yes | Yes | Yes |
| Clump strength, % | N/A | 92 | 94 | 94 | 97 |

Synergistic absorbance was observed when the zeolite particulate KMI −8+14 was blended with differently sized sodium bentonite Wyo-Ben™ BH-8 and BH-30. Of the tested ratios, absorption benefits over 200% were measured and greatest absorbencies observed at a bentonite to DE ratio of 70:30. BH-8 bentonite and zeolite clumped when wetted; however, none of the blends demonstrated high clump strength. In contrast, the BH-30 bentonite and zeolite blend demonstrated both self-clumping for all ratios but with high clump strengths at a bentonite level of at least 30%. Thus, higher absorbency with good clump strength may be obtained when using zeolites and sodium bentonite.

Example 8

A non-clumping particulate, Klein's Zeolite sieved to −20+50, was thoroughly mixed in weight ratios of 0:100, 30:70, 50:50, 70:30 and 100:0 with sodium bentonite. The zeolite particulates were blended with Wyo-Ben™ BH-8 and BH-30 individually and their water absorbency, absorption benefit, dry density, density benefit, moisture, self-clumping, and clump strength were evaluated as previously described. The results are listed in Table 14 and Table 15.

TABLE 14

Typical Properties of Sodium Bentonite (Wyo-Ben ™ BH-8) Mixed with Zeolite (KMI's Zeolite −20 + 50) at Various Weight Ratios

| | Sodium Bentonite (BH-8):Zeolite (−20 + 50) Ratio | | | | |
|---|---|---|---|---|---|
| | 0/100 | 30/70 | 50/50 | 70/30 | 100/0 |
| Water Absorbency, % | 35 | 190 | 267 | 249 | 149 |
| Absorption Benefit, % | N/A | 275 | 290 | 217 | N/A |
| Dry Density, kg/m³ | 1089 | 1103 | 1182 | 1153 | 1107 |
| (lb/ft³) | (68) | (69) | (74) | (72) | (69) |
| Density Benefit, % | N/A | −1 | −8 | −5 | N/A |
| Moisture, % | 6 | 6 | 6 | 8 | 8 |
| Self-clumping | Yes | No | Yes | Yes | Yes |
| Clump strength, % | 0 | N/A | 0 | 0 | 94 |

TABLE 15

Typical Properties of Sodium Bentonite (Wyo-Ben ™ BH-30) Mixed with Zeolite (KMI's Zeolite −20 + 50) at Various Weight Ratios

| | Sodium Bentonite (BH-30):KMI Zeolite (−20 + 50) Ratio | | | | |
|---|---|---|---|---|---|
| | 0/100 | 30/70 | 50/50 | 70/30 | 100/0 |
| Water Absorbency, % | 35 | 179 | 236 | 242 | 150 |
| Absorption Benefit, % | N/A | 258 | 255 | 210 | N/A |
| Dry Density, kg/m³ | 1089 | 1055 | 1073 | 1073 | 1121 |
| (lb/ft³) | (68) | (66) | (67) | (67) | (70) |
| Density Benefit, % | N/A | 4 | 2 | 4 | N/A |
| Moisture, % | 7 | 6 | 6 | 6 | 7 |
| Self-clumping | Yes | Yes | Yes | Yes | Yes |
| Clump strength, % | 0 | 0 | 92 | 96 | 97 |

Synergistic absorbance was observed when the zeolite particulate KMI −20+50 was blended with differently sized sodium bentonite Wyo-Ben™ BH-8 and BH-30. Of the tested ratios, absorption benefits over 200% were measured and greatest absorbencies observed at a bentonite to DE ratio of 70:30, BH-8 bentonite and zeolite clumped when wetted; however, none of the blends demonstrated high clump strength. In contrast, the BH-30 bentonite and zeolite blend demonstrated both self-clumping for all ratios but with high clump strengths at a bentonite level of at least 50%. Thus, higher absorbency with good clump strength can be obtained when using zeolites and sodium bentonite.

The results above demonstrate that each of the components of the disclosed compositions have less absorbency combined than the compositions, thereby demonstrating the synergistic absorbency properties of the disclosed compositions. Of the tested ratios, the greatest absorbency appears to be reached at about a 50:50 or 70:30 ratio of clumping sorbent particulate (sodium bentonite) to non-clumping particulate (diatomaceous earth or zeolite), depending on the particulate composition and PSD.

Example 10

Synergistic absorbance may also be observed when the composition consists of multiple components. 10 wt. % zeolite (KMI, −8+14) as a non-clumping particulate to replace 10 wt. % of the DE (EPM Blue Ribbon™) in a 50:50 weight ratio composition of sodium bentonite to diatomaceous earth. The clumping component may be of different sizes, such as Wyo-Ben™ BH-8 or BH-30. Thus, in the example, the resulting composition is 10 wt. % zeolite, 40 wt. % DE and 50 wt. % sodium bentonite. Water absorbency, absorption benefit, dry density, density benefit, moisture, self-clumping, and clump strength were evaluated as previously described. Typical properties of these blends and that of the individual components are listed in Table 16.

TABLE 16

Typical Properties of Sodium Bentonite (Wyo-Ben ™ BH-30 or BH-8) Mixed With DE (EPM Blue Ribbon ™) And Zeolite (KMI's Zeolite, −8 +14)

| | Zeolite 100% | DE 100% | BH-8/DE/ Zeolite 50%/ 40%/10% | BH-30/DE/ Zeolite 50%/ 40%/10% | BH-8 100% | BH-30 100% |
|---|---|---|---|---|---|---|
| Water Absorbency, % | 31 | 83 | 225 | 267 | 149 | 150 |
| Absorption Benefit, % | N/A | N/A | 203 | 240 | N/A | N/A |
| Dry Density, kg/m³ (lb/ft³) | 929 (58) | 464 (29) | 737 (46) | 769 (48) | 1107 (69) | 1121 (70) |
| Density Benefit, % | N/A | N/A | 11 | 8 | N/A | N/A |
| Moisture, % | 7 | 1 | 6 | 6 | 8 | 7 |
| Self-clumping | No | No | Yes | Yes | Yes | Yes |
| Clump strength, % | N/A | N/A | 0 | 91 | 94 | 97 |

Once again, the compositions demonstrate a significant synergistic absorption performance. The investigated blends of sodium bentonite, diatomaceous earth, and zeolite demonstrated absorption benefits over 200%. A density benefit up to about 11% was also observed. Thus, higher absorbency with good clump strength may be obtained when using zeolites, diatomaceous earth, and sodium bentonite while maintaining a relatively low density.

Example 11

The DE may be treated by water to reduce dust generation during handling of the material. A clumping particulate, sodium bentonite (Wyo-Ben™ BH-8 or BH-30), was thoroughly mixed with a non-clumping particulate, DE (EPM Solid-A-Sorb®) treated with water, in ratios of 0:100, 30:70, 50:50 and 100:0. The diatomaceous earth was treated such that its moisture content was about 11%. Water absorbency, absorption benefit, dry density, moisture, self-clumping, and clump strength were evaluated as previously described. The results are shown in Table 17 and Table 18 for a blend containing Wyo-Ben™ BH-8 or BH-30, respectively. In other embodiments, the diatomaceous earth may be treated with water or the like such that its moisture content is in the range of about 5% to about 50%. In other embodiments, the diatomaceous earth may be treated with water or the like such that its moisture content may be in the range of about 10% to about 20%. In some embodiments, the novel composition of DE (in the form of discrete particles) and sodium bentonite (in the form of discrete particles) may have a moisture content greater than 2.5% to less than about 50%.

TABLE 17

Typical Properties of Sodium Bentonite (Wyo-Ben™ BH-8) Mixed With DE (EPM Solid-A-Sorb) Containing 11% Moisture

| | Sodium Bentonite (BH-8):Diatomaceous Earth (Solid-A-Sorb ® + H$_2$O) Ratio | | | | |
|---|---|---|---|---|---|
| | 0:100 | 30:70 | 50:50 | 70:30 | 100:0 |
| Water Absorbency, % | 152 | 173 | 202 | 219 | 149 |
| Absorption Benefit, % | N/A | 104 | 125 | 140 | N/A |
| Moisture, % | 11 | 8 | 8 | 9 | 8 |
| Self-clumping | Yes | Yes | Yes | Yes | Yes |
| Clump strength, % | 0 | 0 | 0 | 0 | 94 |

TABLE 18

Typical Properties of Sodium Bentonite (Wyo-Ben™ BH-30) Mixed With DE (EPM Solid-A-Sorb ®) Containing 11% Moisture

| | Sodium Bentonite (BH-30):Diatomaceous Earth (Solid-A-Sorb ® + H$_2$O) Ratio | | | | |
|---|---|---|---|---|---|
| | 0:100 | 30:70 | 50:50 | 70:30 | 100:0 |
| Water Absorbency, % | 152 | 334 | 350 | 372 | 150 |
| Absorption Benefit, % | N/A | 221 | 232 | 247 | N/A |
| Moisture, % | 11 | 8 | 9 | 9 | 7 |
| Self-clumping | Yes | Yes | Yes | Yes | Yes |
| Clump strength, % | 0 | 0 | 0 | 94 | 97 |

Surprisingly, even with the added moisture, the absorbency of the mixtures is up to about 2.5 times that of individual fractions and over 100% the expected absorbency based on the rule of mixtures. Although all blends clumped when wetted, high clump strength was only observed at higher sodium bentonite levels for the BH-30 particulates. A high absorption benefit and absolute absorbency was reached at a sodium bentonite to DE weight ratio of 70:30. Thus, higher absorbency and good clump strength can be obtained when using diatomaceous and sodium bentonite.

Example 12

A lower arsenic concentration in the composition can be achieved by utilizing particulates which have low arsenic concentrations. Herein, arsenic concentrations were measured via X-ray fluorescence (XRF) using a spectrometer (S4 Explorer™ Bruker® AXS GmbH, Germany). Arsenic concentration is commonly measured in parts per million (ppm). Diatomaceous earth from EPM's Sequoya ore deposit in Nevada, USA possesses low As concentration. When blended with a low As Na-bentonite, such as Wyo-Ben™ BH-30, the resultant blend maintains a lower As concentration (Table 19).

TABLE 19

Typical As Concentration of Sodium Bentonite (Wyo-Ben™ BH-30) Mixed With DE (EPM Sequoya ore deposit)

| | Sodium Bentonite (BH-30):Diatomaceous Earth (EPM Sequoya ore) Ratio | | | | |
|---|---|---|---|---|---|
| | 0:100 | 30:70 | 50:50 | 70:30 | 100:0 |
| Arsenic (ppm) | 11 | 13 | 14 | 15 | 17 |

Example 13

A lower quartz concentration in the disclosed novel compositions can be achieved by utilizing particulates which have low quartz concentrations. The DE ores and DE products (for example, EPM Blue Ribbon™, EPM Ultra Sorb™, EPM Floor Dry™, EPM Solid-A-Sorb®) utilized in the exemplary novel compositions contain low levels of quartz (commonly <1%). When blended with Na-bentonite, such as Wyo-Ben™ BH-30 or BH-8, with quartz levels of about 8%, the resultant blend has a low quartz concentration (Table 20). Thus, the disclosed novel compositions have a quartz content of less than about 20%. In some embodiments, the quartz content may be less than about 15%. In some embodiments, the quartz content of the disclosed novel compositions may be less than about 8%.

TABLE 20

Typical Quartz Concentration of Sodium Bentonite (Wyo-Ben™ BH-30) Mixed With DE (EPM Solid-A-Sorb ®)

| | Sodium Bentonite (BH-30):Diatomaceous Earth (Solid-A-Sorb ® + H$_2$O) Ratio | | | | |
|---|---|---|---|---|---|
| | 0:100 | 30:70 | 50:50 | 70:30 | 100:0 |
| Quartz (%) | 0.2 | 1.4 | 2.3 | 3.4 | 7.8 |

Also disclosed is a method of making the composition. The composition may be made by mixing the clumping particulate with the non-clumping particulate. One disclosed method for manufacturing low density compositions with synergistic absorbance properties may include: (1) filling two powder bins, each with clumping particulate and non-clumping particulate, the bins equipped with weight belt feed bin or loss-in-weight feeder or any other device that is used for measuring the flow rate of particulates; (2) simultaneously metering the contents of both particulate bins at a rate that satisfies the blending ratio for the final product; (3) discharging both materials into a blender, mixer, or agitator to effect fluidization of the particulates at the first half of the equipment chamber; and (4) spraying atomized water into the fluidized material at a predetermined dosage rate in the second half of the mixing equipment chamber to cause even distribution of moisture into the material. The water dosage rate is based on the amount that visually mitigates dust when the product is poured from a height of greater than 1 meter (3.28 feet). The water treated blend is then packaged in containers or bags.

INDUSTRIAL APPLICABILITY

The compositions disclosed herein may be particularly beneficial for industrial and household absorption and solidification, solidification of waste oil and gas drilling fluids, animal litter (for example, cat litter), and soil amendment. Embodiments of the disclosed compositions may have a low dry density (below 945 kg/m$^3$) (59 lb/ft$^3$) and high water absorbency (above 170%).

While only certain embodiments have been set forth, alternative embodiments and various modifications will be apparent from the above description to those skilled in the art. These and other alternatives are considered equivalents and within the spirit and scope of this disclosure.

What is claimed:

1. A composition comprising:
   discrete particles of diatomaceous earth; and
   discrete particles of sodium bentonite,
   wherein the composition has:
   a clump strength greater than about 75%,
   a dry density less than about 880 kg/m$^3$, and an absorbency per unit weight that exceeds a weighted average absorbency of the discrete particles of diatomaceous earth and the discrete particles of sodium bentonite by more than about 50%.

2. The composition of claim 1, wherein the quartz content is less than about 20%.

3. The composition of claim 1, wherein the discrete particles of diatomaceous earth contain a moisture content between about 5% to about 50%.

4. The composition of claim 1, further comprising one or more of hectorite, attapulgite, sodium-beneficiated calcium bentonite, zeolite or combinations thereof.

5. The composition of claim 1, wherein the composition has an arsenic concentration less than about 17 ppm.

6. The composition of claim 1, wherein the absorbency per unit weight of the composition exceeds the weighted average absorbency by more than 100%.

7. The composition of claim 1, wherein the composition is self-clumping, and has an absorbency in the range of about 170% to about 500%.

8. The composition of claim 7, wherein the composition has a quartz content less than about 15%.

9. The composition of claim 7 further comprising zeolite.

10. The composition of claim 7, wherein the composition has a moisture content greater than about 2.5% and less than about 50%.

\* \* \* \* \*